May 21, 1968 E. J. SCHAEFER ET AL 3,384,769
MODULAR MOTOR ASSEMBLY
Filed Aug. 25, 1965 5 Sheets-Sheet 1

Inventors:—
Edward J. Schaefer,
Alfred F. Refice
Donald L. Ellenberger,
By Hibben, Noyes & Bicknell
Attys.

May 21, 1968

E. J. SCHAEFER ET AL 3,384,769

MODULAR MOTOR ASSEMBLY

Filed Aug. 25, 1965

May 21, 1968   E. J. SCHAEFER ETAL   3,384,769
MODULAR MOTOR ASSEMBLY
Filed Aug. 25, 1965   5 Sheets-Sheet 4

United States Patent Office 3,384,769
Patented May 21, 1968

3,384,769
MODULAR MOTOR ASSEMBLY
Edward J. Schaefer, Alfred F. Refice, and Donald L. Ellenberger, Bluffton, Ind., assignors to Franklin Electric Co., Inc., Bluffton, Ind., a corporation of Indiana
Filed Aug. 25, 1965, Ser. No. 482,491
40 Claims. (Cl. 310—87)

This invention relates to electric motors, and more particularly to a submersible assembly including a plurality of motor modules.

The use of relatively small diameter electric motors has become increasingly important in recent years. In oil fields, for example, electric motors are being extensively used for pumping and other operations. One factor that must be considered in the design of an electric motor for use in such an environment is the fact that the diameter of a well bore is relatively small, and therefore the diameter of an electric motor must be still smaller if it is to be lowered into the well. To obtain higher horsepower ratings, the length of electric motors has been increased because it is impossible to increase the diameter due to the limitation imposed by the diameter of the well bore. However, it has been found that it is not practical to build an electric motor beyond a certain length, primarily because of rotor shaft vibration and other limiting factors.

Accordingly, it is a primary object of the present invention to provide an assembly of electric motor modules which may be connected together to provide the length needed for higher horsepower ratings, for use in an oil well, for example.

It is another object to provide an assembly of the foregoing character, wherein an almost unlimited number of electric motor modules may be connected together to provide a wide range of power outputs.

Still another object is to provide an assembly of the foregoing character, including an auxiliary module which houses, for example, seals, pressure equalizers and thrust bearings.

A still further object is to provide an assembly of the foregoing character, including an improved apparatus for equalizing the internal fluid pressure of the assembly with the external pressure.

A further object is to provide an assembly of the foregoing character, including a plurality of substantially identical motor modules each having a separate fluid circulation system, and a single pressure equalizing apparatus.

Other objects and advantages of the invention will become apparent from the following description taken in conjunction with the accompanying figures of the drawings, in which.

Generally, an assembly embodying the invention comprises a plurality of modules connected in vertically stacked relation. One of the modules of the assembly is referred to herein as an auxiliary module, and the remainder of the modules are essentially identical motor modules. Adjacent motor modules are mechanically and electrically connected together by connecting members, and the lower end of the sasembly is closed by a lower end termination member. The number of motor modules in an assembly may be chosen to provide the power output required.

An important feature of the invention lies in the construction of the auxiliary module. This module includes means for connecting the assembly to a unit, such as a pump, to be driven and a multiple thrust bearing for balancing the thrust of the unit. The auxiliary module further includes apparatus for equalizing the pressure within the assembly, which is filled with a cooling and lubricating fluid such as oil with the pressure of an ambient fluid. The equalizing apparatus is constructed such that a limited amount of fluid may flow into and out of the auxiliary module as the internal fluid expands and contracts due to heating and cooling during operation, but nevertheless outside fluid cannot enter the motor modules where it might destroy the bearings, for example. The equalizing apparatus is further constructed such that it would not be rendered ineffective even though the assembly is laid down on its side or turned over a number of times. The auxiliary module still further includes rotary shaft seals which are interconnected with the pressure equalizing apparatus in such a manner that the pressure around them is equalized in order to prevent excessive strain on the seals. Another important feature of the invention lies in the construction of the motor modules. Each motor module is provided with a cooling and lubricating fluid, and the fluid circulation system for each motor module is maintained separate from the fluid circulation systems of the adjacent modules. Nevertheless, the pressure equalizing apparatus in the auxiliary module serves to equalize the pressure in all of the motor modules even though their circulation systems are maintained separate.

The connecting members between adjacent motor modules separate the fluid circulation systems of adjacent motor modules, they electrically connect the windings of adjacent motor modules, they mechanically connect the rotor shafts of adjacent motor modules, and they serve as a heat sink or radiator for transferring heat from the system to the ambient fluid.

Figures 1, 2, 5, 6, 7:
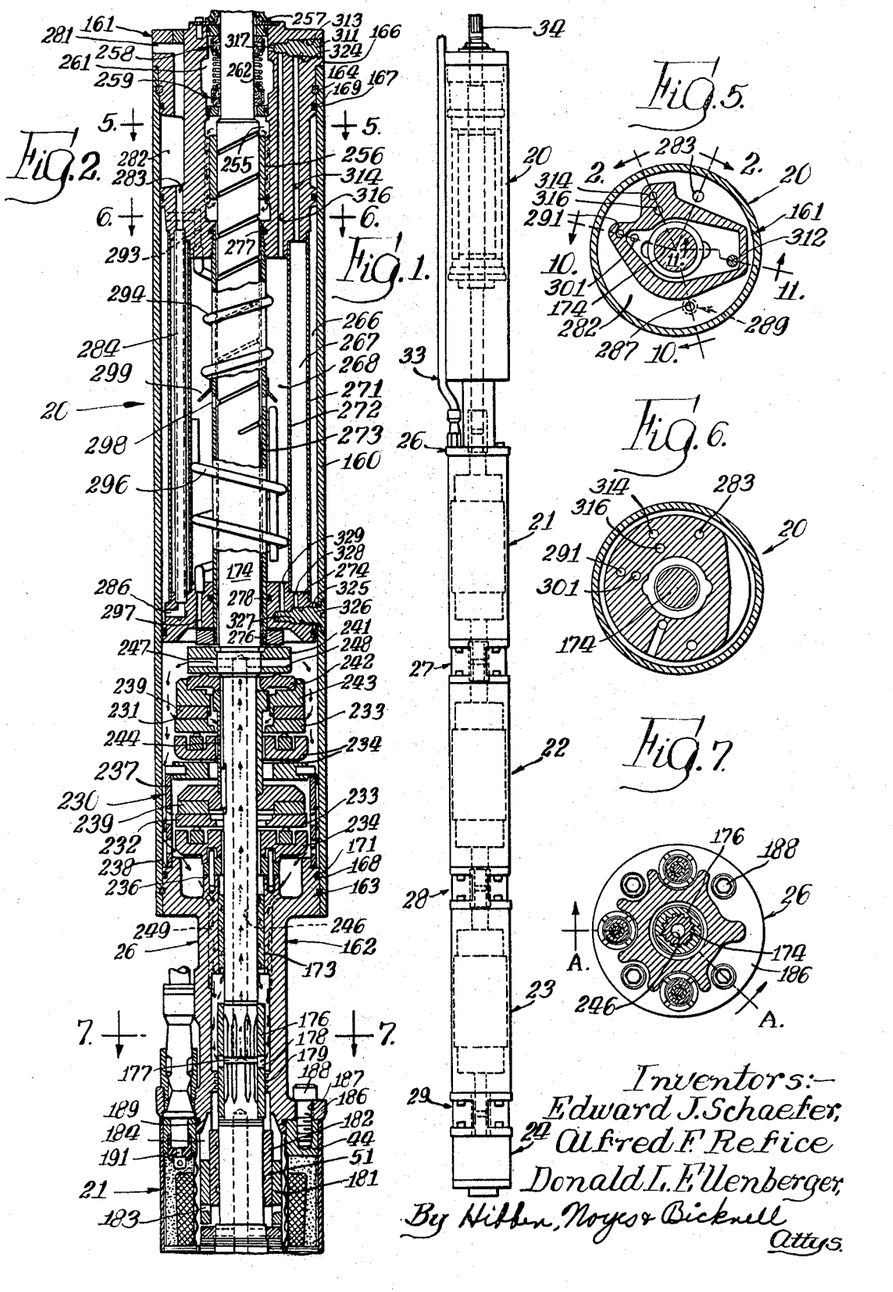
FIG. 1 is an elevational view of an assembly embodying the invention.
FIG. 2 is an enlarged fragmentary sectional view taken on the line 2—2 of FIG. 5.
FIG. 5 is a sectional view taken on the line 5—5 of FIG. 2.
FIG. 6 is a sectional view taken on the line 6—6 of FIG. 2.
FIG. 7 is a sectional view taken on the line 7—7 of FIG. 2.

In greater detail, the assembly shown in FIG. 1 comprises an auxiliary module 20, substantially identical motor modules 21, 22 and 23, and a lower end termination member 24. The auxiliary module 20 is connected to the motor module 21 by a connecting member 26, the modules 21 and 22 are connected together by a connecting member 27, the modules 22 and 23 are connected together by a connecting member 28, and the module 23 is connected to the lower end termination member 24 by still another connecting member 29. The connecting members 27, 28 and 29 are substantially identical and may be connected to or disconnected from the associated motor modules. The connecting member 26 is permanently secured to the auxiliary 20 and detachably connected to the motor module 21, and it is designed to electrically connect the windings of the motor module 21 to a three wire cable 33 which leads to a three phase power supply (not shown).

While the motor windings may be connected together in parallel, the electrical circuit of the assembly as shown is such that the windings of the motor modules 21, 22 and 23 are connected together in series and the lower end termination member 24 provides an electrical "Y" type connection. The motor modules 21 to 23 preferably have the same horsepower rating, such as five horsepower in which case the assembly illustrated would deliver a total of fifteen horsepower. Assuming a 220 volt drop across each motor module, the supply voltage would have to be 660 volts because the windings are connected in series. If five motor modules were provided in an assembly, the supply voltage would have to be stepped up, by means of a suitable transformer, for example, to 1100 volts. The motor modules 21, 22 and 23 and the lower end termination member 24 are sealed against entrance of ambient fluid and the connecting members 26, 27, 28 and 29 form fluid tight connections between adjacent modules and the lower end termination member 24. The motor modules 21, 22 and 23 also include motor shafts (not shown in FIG. 1) which are connected together by suitable couplings within the connecting means 27 and 28. The auxiliary module 20 also includes a rotatable shaft extending therethrough, the lower end of the module 20 shaft being connected to the upper end of the motor module 21 shaft by a suitable coupling within the connecting member 26. The upper end, indicated by the numeral 34, of the shaft of the auxiliary module 20 extends upwardly out of the housing of the module 20, and may be splined for connection with a unit, such as a pump, to be driven by the assembly.

Figures 3, 4, 8, 9:
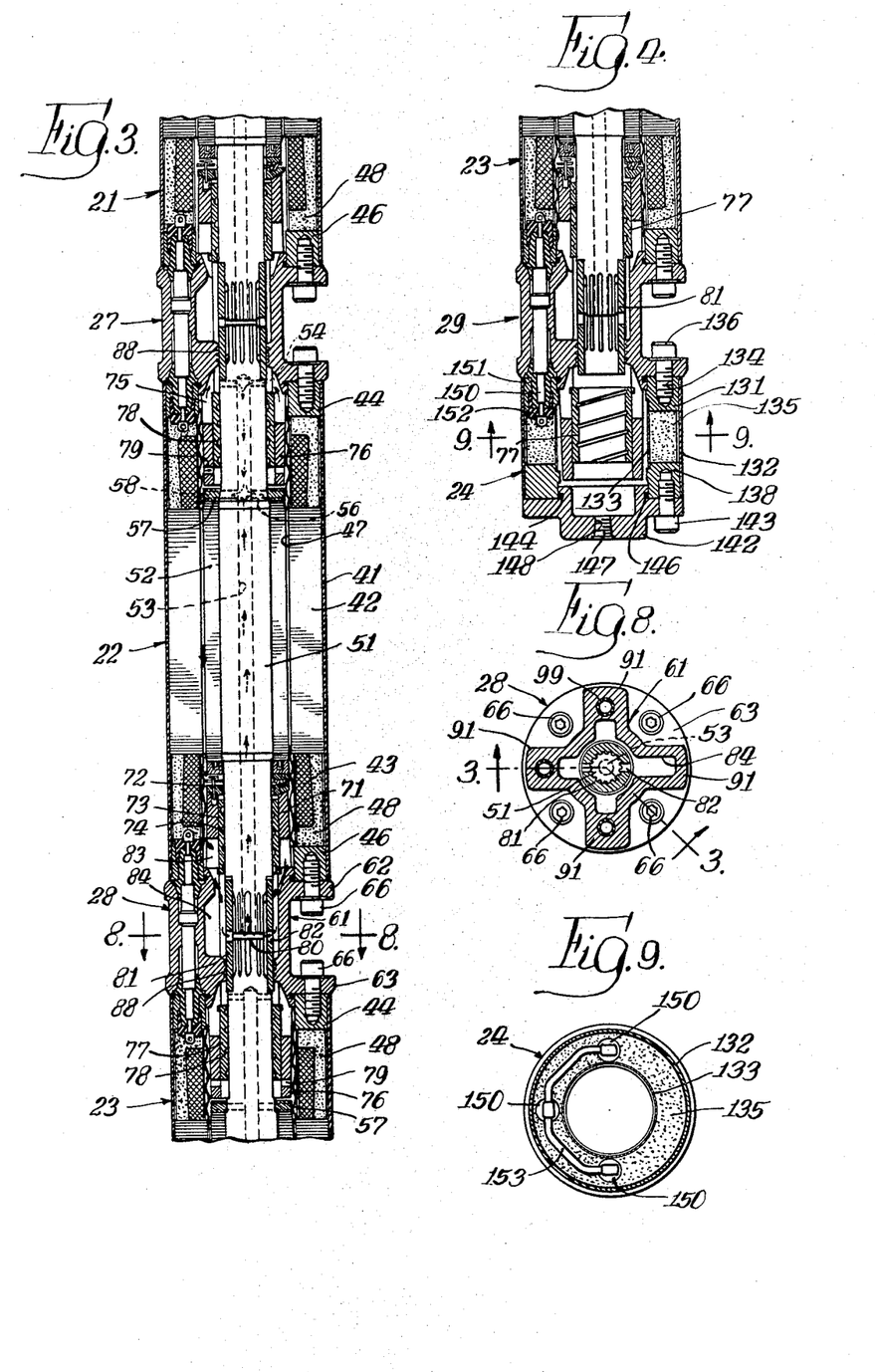
FIG. 3 is another enlarged fragmentary sectional view taken on the line 3—3 of FIG. 8.
FIG. 4 is still another enlarged fragmentary sectional view of still another portion of the assembly.
FIG. 8 is a sectional view taken on the line 8—8 of FIG. 3.
FIG. 9 is a sectional view taken on the line 9—9 of FIG. 4.

As stated previously, the motor modules 21 to 23 are preferably substantially identical. With reference to FIG. 3, the motor module 22 comprises an outer casing 41 in the form of a hollow cylinder, within which is secured a stator comprising a stack of laminations 42 and stator windings 43. Circular end rings 44 and 46 are provided at the upper and lower ends, respectively, of the motor module 22, the end rings 44 and 46 being positioned within the ends of and secured to the casing 41. The motor module 22 is designed to be filled with a cooling and lubricating fluid such as oil, and to prevent this fluid from reaching the windings 43 of the stator, the inner periphery of the stator is covered by a thin tubular liner 47 which extends to the two end rings 44 and 46 and is secured thereto. The interior of the stator is also sealed with a potting compound, represented by the numeral 48 which extends into the slots in the laminations 42 and around the ends of the stator windings 43, the potting compound encapsulating the windings 43.

The motor module 22 further comprises a rotor including a rotor shaft 51 having secured thereto a stack of rotor laminations 52. Rotor windings (not shown) are secured in the laminations 52 and may have a conventional squirrel cage configuration.

To provide a path for circulation of the cooling and lubricating fluid, as will be described hereinafter, a longitudinally extending fluid passageway 53 is formed at the axis of the rotor shaft 51, the passageway 53 extending from the lower end of the rotor shaft 51 upwardly to a plurality of radially extending passageways 54 formed in the shaft. The passageways 54 are spaced downwardly from the upper end of the rotor shaft 51 as shown in FIG. 3, and they extend from the passageway 53 to the outer surface of the shaft 51. The number and location of the radial passageways 54 should be such that the rotor shaft 51 is balanced.

Additional radially extending fluid passageways 56 are formed in the rotor shaft 51, which are spaced a greater distance from the upper end of the shaft 51 than the passageways 53, the passageways 56 being generally similar to the passageways 54 and extending from the axial passageway 53 to the outer surface of the rotor shaft 51. A circular plate 57, which forms an impeller, is also provided, the impeller plate 57 extending around and being secured to the outer periphery of the rotor shaft 51. Radially extending holes 58 are formed through the impeller plate 51, the holes 58 being located such that they radially line up with the passageways 56 formed in the rotor shaft 51. During the operation of the motor, rotation of the shaft 51 and the impeller plate 57 causes fluid from within the axial fluid passageway 53 to be thrown radially outward of the holes 58, thus causing circulation of the fluid through the motor module 22.

As previously stated, the connecting member 28 is preferably substantially identical to the connecting members 27 and 29, and comprises a generally tubular casting 61 (FIGS. 3, 8 and 13) having upper and lower flanges 62 and 63, respectively, formed thereon. Holes 64 are formed through the flanges 62 and 63, and bolts 66 are positioned through the holes 64 and screwed into internally threaded holes formed in the end rings 44 and 46 of the modules 22 and 21, respectively. An O-ring seal 67 is provided between adjoining surfaces of the casting 61 and each of the end rings 44 and 46 in order to prevent the leakage of fluid between the flanges 62 and 63 and the end rings 44 and 46.

The casting 61 is also provided with a projection 71 which extends upwardly into the rotor cavity of the motor module 22 and supports a conventional thrust bearing 72 (FIG. 3). The thrust bearing 72 may be of the Kingsbury type, and has one portion secured to the rotor shaft 51 of motor module 22 and another portion which engages and is supported by the upper end of the projection 71, the thrust bearing 72 being provided to support the weight of its associated rotor. In addition to the thrust bearing 72, the projection 71 also supports a radial bearing 73 which at its inner periphery engages the outer surface of the rotor shaft 51 and is supported by the projection 71 at its outer periphery. A helical groove 74 is fromed on the inner surface of the radial bearing 73, the groove 74 permitting the circulation of a cooling and lubricating fluid between the radial bearing 73 and the rotor shaft.

It should be noted that the foregoing description of the construction at the lower end of the motor module 22 also applies to the construction at the lower end of the motor modules 21 and 23 because these constructions are identical, and the same reference numerals are used for the corresponding parts.

The lower end of the casting 61 is provided with a projection 76 which extends downwardly into the rotor cavity of the motor module 23. At its inner periphery, the projection 76 supports a radial bearing 77 which is similar to the bearing 73, and a helical groove 78 is formed in the inner surface of the bearing 77 to permit the fluid to circulate between the rotor shaft 51 and the bearing 77. The lower end of the projection 76 terminates just above the impeller plate 57 of the module 23 and a plurality of radially extending holes 79 are formed through the projection 77, through which fluid flows as will be described hereinafter.

The rotor shafts 51 of the motor modules 21 and 22 are connected together by splined sleeve type coupling 81 included in the member 27. It is preferred that the coupling 81 be secured to the end of one of the two rotor shafts. For example, the coupling 81 is preferably secured as by a press fit to the lower end of its upper associated motor module. By this construction, the sleeve coupling is prevented from becoming inadvertently detached from one of the rotor shafts, and the other of the rotor shafts may be slipped into the coupling 81 when a pair of motor modules are connected together.

Figure 13:
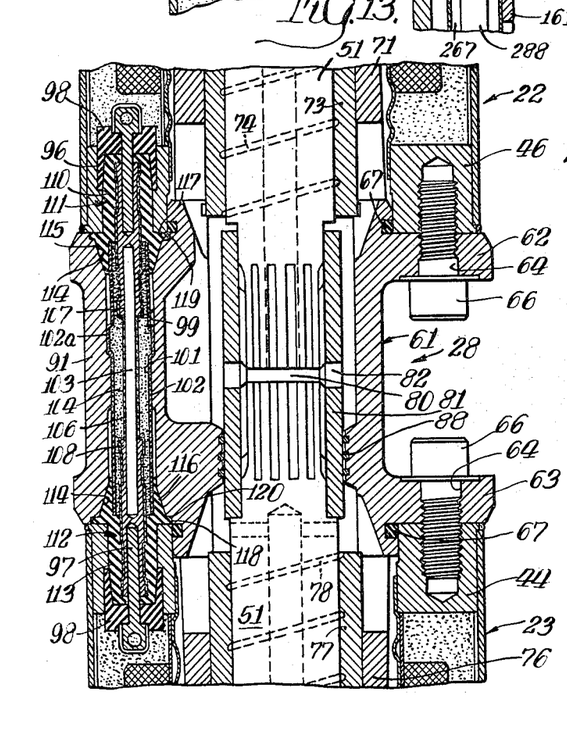
FIG. 13 is another fragmentary enlarged sectional view of a portion of the structure shown in FIG. 3.

As shown in FIGS. 3 and 13, the adjacent ends of each pair of rotor shafts 51 are spaced a short distance apart, the space between the shafts forming a passageway 80. A plurality of radially extending holes 82 are formed through the sleeve coupling 81, the holes 82 being located over the passageway 80 between the rotor shafts 51 and permitting the flow of fluid from outside the coupling 81 to the passageway 80.

Assuming that the motor modules have been filled with a cooling and lubricating fluid, rotation of the rotor shaft 51 and the impeller plate 57 of each module causes circulation of the fluid along two paths, one extending upwardly from the impeller plate 57 and the other extending downwardly from plate 57. With reference to FIG. 3, one of the paths extends radially outwardlly from the holes 58 of the impeller plate 57 of module 22, and upwardly as indicated by the arrows through a narrow annular space between the inner periphery of the liner 47 and the outer periphery of the projection 76. A portion of the fluid flows radially inward through the holes 79 formed in the projection 76 and upwardly through the helical groove 78 formed in the inner surface of the bearing 77 to the radial passageway 54 of the rotor shaft 51, while the remainder of the fluid flows around the outside of the projection 76, and inwardly through openings 75 to the passageway 54. The fluid flows radially inward through the passageway 54, and then downwardly through the axial passageway 53 formed in the rotor shaft 51 to the radial passageway 56, where it again flows radially outward through the impeller holes 58.

The fact that the distance from the axis of the shaft 51 to the outer periphery of the impeller plate 57 is greater than the distance from the axis of the shaft 51 to its outer periphery at the location of th passageways 54, causes the pressure at the outer periphery of the impeller plate 57 to be higher than the preessure at the passageways 54. This difference in pressure causes the fluid to circulate as described above.

The other circulatory path for the cooling and lubricating fluid also includes the holes 58 of the impeller plate 57. From the holes 58, the fluid flows downwardly between the inner periphery of the liner 47 and the outer periphery of the laminations 52 of the rotor, through and around the thrust bearing assembly 72, by one path through the helical groove 74 formed in the inner surface of the bearing 73 and by another path around the outer periphery of the downwardly extending projection 71, through openings 83 fromed in the casting 61, through an annular passageway 84 formed in the casting adjacent the coupling 81, radially inward through the holes 82 in the coupling 81 and into the space 80 between the ends of the rotor shafts, and then upwardly through the axial passageway 53 formed in the shaft 51 to the radial passageways 56, thus completing the second flow path of the fluid.

All of the motor modules are filled with a cooling and lubricating fluid, and the fluid within each motor module is kept substantially separate from the fluid in the adjacent modules by a labyrinth seal 88 provided in each of the connecting members 27, 28 and 29. In each connecting member the labyrinth seal 88 is formed on the inner periphery of the casting 61 between the holes 82 of the coupling 81 and the lower end of the coupling 81, and serves to prevent a substantial transfer of fluid between adjacent modules. The labyrinth seals 88 will however permit a limited amount of fluid to flow between adjacent modules with the result that the fluid systems of all of the modules are interconnected. While the labyrinth seals 88 prevent any substantial flow of fluid from one module to the other, they do transmit fluid pressure from one module to the other so that a single pressure equalizing apparatus in the auxiliary module, as described hereinafter, will serve to equalize the fluid pressure throughout the assembly.

The connecting members 27, 28 and 29 also include means for making electrical connections between the windings of the motor modules 21, 22 and 23, and the electrical conductors within the lower end termination member 24. Each member 27, 28 and 29 includes three electrical connectors, and all of the connector members 27, 28 and 29 may be identical. One electrical connector for the member 28 is shown in detail in FIG. 3 and 13.

The casting 61 is formed with four fins 91 (FIG. 8) which extend radially outward and between the two flanges 62 and 63. The openings or fluid passageways 84 of the casting 61 extend into the fins 91, and passage of fluid through the openings 84 during circulation as previously described causes heat from the fluid to be transferred to the walls forming the fins and from these walls to the ambient fluid. Therefore, the fins 91 serve as heat radiating surfaces for the purpose of expelling heat from the assembly, and they also strengthen the connecting members.

The electrical connectors for connecting the three phase windings of the motor module 22 to the three phase windings of the motor modules 23 are contained in three of the four fins 91. The openings 84 in these three fins are not as large as the opening 84 of the fin which does not contain an electrical connector.

At the lower end of the motor module 22, there are provided three downwardly extending metal prongs 96 (one shown in FIG. 13), each of the prongs 96 being connected to one of the three phase windings of the motor module 22. At the upper end of the motor module 23 are provided three similar metal prongs 97 which are connected to the three phase windings of the motor module 23. The prongs 96 and 97 are supported by the end rings 46 and 44, and cup members 98 made of an insulating material are provided to support the prongs 96 and 97 in electrically insulated relation on the end rings 46 and 44.

A fin 91 (FIG. 13) of the casting 61, of the form containing an electrical connector is provided with a longitudinally extending circular bore 99, which has an internally threaded portion 101 located substantially midway between its ends. A connector tube 102 having an externally threaded portion 102a, which may be formed by rolling is connected to the fin 91 by threaded engagement with the portion 101, and the tube 102 supports a metal rod 103 which is located concentrically within the tube 102. At the ends of the rod 103 are secured two metal sockets 107 and 108 which are designed to snugly receive the prongs 96 and 97. The sleeves 107 and 108 extend longitudinally beyond the ends of the tube 102 and the fin 91, and bores at the ends of the sockets 107 and 108 slide over the associated prongs when the connecting member 28 is secured to the modules 22 and 23. The rod 103 and the sockets 107 and 108 are located within the tube 102 but are held spaced therefrom by an insulating material such as a putty compound 104. Before the rod 103 and the sockets 107 and 108 are potted in the tube, they are preferably coated with another layer 106 of insulation, which may be of the type sold under the trademark Natvar. Two tubular insulating members 111 and 112 are also provided at the upper and lower ends, respectively of the fins 91. The insulating members 111 and 112 include generally cylindrical portions 110 and 113, respectively, which are positioned within openings formed in the end rings. The sockets 107 and 108 extend through the openings of the tubular members 111 and 112, and around the prongs. The other end of each member 111 and 112 extends into an end of the bore 99. The ends of the bore 99 taper outwardly as indicated at 114, and the ends of the members 111 and 112 which extend into the bore 99 have a mating taper as indicated at 115 and 116. When the members 111 and 112 are compressed during assembly of the casting 61 with the motor modules radial flanges 117 and 118 are extruded into recesses 119 and 120 at the ends of the bore 99.

The connecting member 28 normally carries the tubes 102, the sockets 107 and 108 and the rods 103. The prongs 96 and 97 are secured to the windings of the associated motor modules and are carried by the motor modules. The insulating members 98 are carried by the motor modules, while the seal members 111 and 112 are separate members so that they may easily be replaced when they lose their effectiveness as seals due, for example, to aging.

When fastening the connecting member 28, for example, to the motor module 22, the seal members 111 and 112 are first inserted on the sockets 107 and 108 and then the module 22 is lowered onto the connecting member 28 such that the prongs 96 extend into the sockets 107. When the end surfaces of the four fins 91 engage the end ring 46 of the motor module 22, the tapered end 115 of each member 111 engages and is tightly compressed by the tapered portion 114 of the bore 99, and the flange 117 is formed and compressed between adjacent surfaces of the end ring 46 and the connecting member 28. The member 111 thus acts as a seal and prevents fluid from reaching the conductors of the electrical connector. The members 112 are similarly compressed between the end ring 44, of the motor module 23, and the adjacent surface of the member 28.

The generally cylindrical portion 110 and 113 of the members 111 and 112 are slightly tapered, with the result that pressure on the tapered portions 115 and 116 jams the portions 110 and 113 into the openings therefrom, which increases the effectiveness of the seal around the conductors.

The lower end termination member 24 is similar to a motor stator in construction except that it is very short and in place of stator windings and laminations it includes means for connecting the windings together. The construction at the upper end of the lower end termination member 24 is generally the same as the construction at the upper end of a motor module, and comprises an end ring 131 (FIGS. 4 and 9) a tubular outer casing 132 and a liner 133. Internally threaded holes 134 are formed in the end ring 131, which receive bolts 136 for the purpose of securing the lower end termination member 24 to the connecting member 29. The member 24 also includes a lower end ring 138 which is secured to the casing 132 and the liner 133, and the space between the end rings 131 and 138, the casing 132 and the liner 133 is filled with a potting compound 135. A lower end cap 142 is positioned against the lower end ring 138 and secured thereto by bolts 143. An O-ring seal 144 is positioned in a groove 146 formed in the end cap 142 and provides a fluid tight connection between the cap 142 and the end ring 138. A removable plug 147 is threaded into a hole 148 formed in the end cap 142 which may be removed for the purpose of initially filling the assembly with a cooling and lubricating fluid, as will be described hereinafter.

The connecting member 29 is provided with a sleeve coupling 81 and a radial bearing 77 as previously described, and the latter is received within the interior of the lower end termination member 24.

In the member 24 in the case of series connections, there are provided three prongs 150, three members 151 and three members 152, which correspond in construction to the three members 97, 98 and 112, and the connector member 29 includes electrical connectors which are the same as those shown in FIG. 13. The lower end of the prongs 150 are electrically connected together by a conductor 153 (FIG. 9) which is embedded in the potting compound 135, and forms a short circuit, or Y-connection.

The lower end termination member 24 electrically connects the electrical system together and it provides a fluid tight seal at the lower end of the assembly. In addition, the end termination member 24 provides mechanical protection for the lower end of the assembly. Another very important feature of the lower end termination member 24 is the fact that the construction at its upper end corresponds to the construction at the upper end of a motor module. Consequently, either the lower end termination member or another motor module may be connected to the lower end of the connecting member 29, which has the advantage that the connecting members and the motor modules may be standardized in their construction.

In a system where the motor windings are connected in parallel, the prongs 150 and the conductor 153 may be eliminated. In such a construction, the lower end termination member would insulate and prevent grounding of the conductors at the lower end of the assembly.

The construction of the connecting member 26 at the lower end of the auxiliary module 20 is different from the construction of the other connecting members 27, 28 and 29. The member 26 forms part of the auxiliary module 20, and it serves to mechanically couple the remainder of the auxiliary module 20 to the motor module 21, and it also provides means for electrically connecting the conductors of the cable 33 to the electrical circuit of the assembly.

With reference to FIG. 2, the auxiliary module 20 comprises a tubular outer casing 160 and upper and lower end closure members 161 and 162, respectively. The lower end closure member 162 is sized to extend into the lower end of the casing 160 and is secured thereto as by an annular key 163, which is positioned in grooves formed in the outer periphery of the closure member 162 and the inner periphery of the casing 160. The upper end closure member 161 also extends within the upper end of the casing 160 and is secured thereto by an annular key 164 similar to the key 163, and the upper end closure member 161 includes a radially outward extending flange 166 which engages the upper end surface of the casing 160. Annular grooves 167 and 168 are formed in the outer periphery of the end closure members 161 and 162, respectively, and O-ring seals 169 and 171 are positioned in the grooves 167 and 168 in order to prevent leakage of fluid between the casing 160 and the end closure members 161 and 162.

The lower end closure member 162 is similar to the casing 61 of the previously described connecting member 28. The member 162 is generally tubular and supports a radial bearing 173 at its inner periphery. The auxiliary module 20 includes a shaft 174 which extends axially through the module 20, and the lower end of the shaft 174 is journaled in the radial bearing 173. The lower closure member 162 also includes a sleeve coupling 176 which is similar to the previously referred to coupling 81, the coupling 176 connecting the lower end of the shaft 174 to the upper end of the rotor shaft 51 of the uppermost motor module 21. The coupling 176 is non-rotatably connected to the two shafts 174 and 51 by, for example, a splined connection, and the coupling 176 is preferably secured as by a press fit to the lower end of the shaft 174. The adjacent ends of the shafts 174 and 51 are separated to provide a fluid passageway 177 between the adjacent ends of the shafts, and as with the coupling 81, radially extending holes 178 are formed through the coupling 176 in alignment with the passageway 177 for the circulation of fluid as will be described hereinafter. Further, a labyrinth seal 179 formed between the inner periphery of the member 162 and the outer periphery of the coupling 176 between the holes 178 and the lower end of the coupling 176, separates to some extent the fluid within the upper module 20 from the fluid within the motor module 21. As previously stated, however, the labyrinth seal 179 does not prevent completely the transfer of fluid between the two modules 20 and 21 because a certain amount of fluid transfer is required due to expansion and contraction due to heating and cooling of the fluid during operation.

The member 162 also includes a downwardly extending projection 181 which is generally similar to the projection 76 of the casting 61. At its inner periphery, the projection 181 supports a radial bearing 182 for the upper end of the shaft 51 of the motor module 21, and openings 183 and openings 184 are formed through the projection 181 through which fluid may flow through the previously described circulation paths of the cooling and lubricating fluid of the motor module 21. The member 162 also has a radially outward extending flange 186 formed thereon adjacent its lower end, in which holes 187 are formed. Bolts 188 extend through the holes 187 and are screwed into threaded holes formed in the upper end ring 44 of the motor module 21 in order to secure the member 162 to the upper motor module 21. An O-ring seal 189 is preferably provided between the upper end ring 44 and the flange 186 to provide a fluid tight connection between the member 162 and the end ring 44.

The lower end closure members 162 also includes means for electrically connecting the wires of the cable 33 to the windings of the upper motor module 21. With reference to FIG. 12, the motor module 21 includes, at its upper end, for each wire of the cable 33 a prong 191 which is supported by the upper end ring 44 of the motor module but is electrically insulated therefrom by a member 192 made of an insulating material, the member 192 being generally similar to the member 98 previously described. The end ring 44 has a circular bore 44a formed therethrough, through which the prong 191 extends, a generally tubular insulating member 193 being positioned within the bore 44a. The member 193 is generally similar to the insulating member 112 previously described. Again, the lower portion of the member 193 is tapered downwardly and inwardly, so that downward pressure on the member 193 causes the member 193 to be tightly secured in fluid tight relation within the bore 44a and in an opening formed in the insulating member 192.

The closure member 162 includes a flange 196 having an axially extending bore 197 formed therethrough. The lower portion of the bore 197 is smooth while the upper portion is threaded as indicated at 198. The outer periphery of the member 193 at its upper end is tapered as indicated at 199, and the tapered portion 199 is disposed within the bore 197.

At its lower end, the conductor 201 of the cable 33, is covered by three layers 202 of protecting and insulating material, the layers 202 being stripped back from the end portion of the conductor 201 in order to bare the end portion of the conductor 201. An elongated tubular metal sheath 203 is positioned over the end portion of the conductor 201, and the layers 202, and an insulating material such as a potting compound 204 fills the space between the inner periphery of the sheath 203 and the outer surface of the conductor 201 and the layers 202. An elongated socket 206 is connected to the bared end of the conductor 201 and is also embedded in the compound 204, a longitudinal bore 205 being formed in the lower end of the socket 206 which is designed to tightly receive the prong 191. Another layer 204a of insulating material, such as Natvar, may be provided on the outer surface of the socket 206.

To secure the sheath 203 and the conductor 201 to the member 162, a tubular nut 207 is positioned around the sheath 203, which has an externally threaded portion 208 at its lower end, which is designed to mate with the threaded portion 198 of the member 162. A split snap ring 211 is positioned in an annular recess 212 formed in the inner periphery of the nut 207, the ring 211 being sized to engage the bottom of the groove 212 and, at the same time, to engage the outer periphery of a humped portion 213 on the sheath 203. Therefore, as the nut 207 is threaded into the flange 196 of the member 162, the ring 211 exerts downward pressure on the sheath 203 and thus holds the conductor 206 in firm electrical contact with the prong 191. The ring 211 thus permits the nut 207 to rotate relative to the sheath 203 while the parts are being assembled.

In addition to forcing the sheath 203 and the cable downwardly, downward movement of the nut 207 also exerts a downward pressure on a wedge 216 positioned between the outer periphery of the tapered portion 199 of the member 193 and the inner periphery of the smooth wall portion of the bore 197. The inner periphery of the wedge 216 is tapered and mates with the tapered portion 199 of the member 193. The lower end surface of the nut 207 engages the upper end surface of the wedge 216 and forces the wedge 216 downwardly, thereby compressing the tapered portion 199 of the member 193. A portion of the member 193 is extruded to form a flange 217 between the lower end of the wedge 216 and the upper surface of the end ring 44 when the member 193 is compressed by downward movement of the nut 207 and the wedge 216, to further ensure a fluid tight connection around the electrical conductors. An O-ring seal 218 is also preferably provided between the end ring 44 and the outer periphery of the member 162, to further prevent fluid leakage between these two members.

The foregoing construction is advantageous because the tapered surfaces of the member 193 and the wedge 216 are such that fluid pressure acting on them effects a better fluid tight connection. The exterior metal parts of the assembly are preferably made of a non-corrodable material such as stainless steel or copper, because they are exposed to an external fluid which may be corrosive.

The connecting member 26 also supports a multiple thrust bearing assembly 230 (FIG. 2) within the casing 160. The construction of the multiple thrust bearing 230 per se forms no part of the present invention, and, briefly, comprises two bearing units 231 and 232. Each of the bearing units may be of the Kingsbury type, and includes a plurality of circumferentially spaced bearing segments or shoes 233 which are supported by a suitable pivotal support 234. The shoes 233 of the lower bearing unit 232 are supported by the upper central part of the member 162, and the shoes 233 of the upper unit 231 are supported by a sleeve 237 that extends around the lower thrust bearing unit 232 and rests on a flange 238 formed at the outer periphery of the upper end of the member 162. The supports for the bearing shoes 233 are such that the bearing shoes are held against rotation relative to the connecting member 26 and the casing 160.

Each bearing unit 231 and 232 also includes a thrust ring 239 which is connected to and rotates with the shaft 174 and engages the shoes 233. At the upper end of the thrust bearing assembly 230, an impeller plate 241 is provided, which is rigidly secured to the shaft 174 of the module 20. On the underside of the plate 241 are provided a plurality of circumferentially spaced, radially extending levers 242. On its upper side, each lever 242 intermediate its ends engages the underside of the impeller plate 241, and at its outer end each lever 242 engages a support 243 for the thrust ring 239 of the upper unit 231, and at its inner end, each lever 242 engages a sleeve 244 which is positioned around the shaft 174 and is axially movable relative to the shaft 174 but rotates with the shaft by means of a splined connection. The lower end of the sleeve 244 engages the support 243 for the thrust ring 239 of the lower thrust bearing unit 232. Thus, the levers 242 divide the thrust imposed by the shaft 174, between the two units 231 and 232, and the sleeve 244 distributes or transfers one half of the thrust from the levers 242 to the lower thrust bearing 232, the other half of the thrust being transferred directly to the upper thrust bearing unit 231 from the outer ends of the levers 242.

The impeller plate 241 is provided primarily for the purpose of circulating the cooling and lubricating fluid with which the lower portion of the module 20 is filled, through and around the thrust bearing assembly 230. The plate 241 thus serves both to transfer downward thrust from the shaft 174 to the multiple thrust bearing assembly 230 and also to circulate the fluid around the thrust bearing. An axially extending bore 246 is formed in the shaft 174 from its lower end upwardly to the location of the plate 241, and a plurality of radially extending passageways 247 are formed in the shaft 174 from the bore 246 outwardly to the outer surface of the shaft 174. The impeller plate 241 also has a plurality of radially extending holes 248 formed therethrough which are radially aligned with the passageways 247 formed in the shaft 174.

Rotation of the shaft 174 and the impeller plate 241 causes fluid within the passageways 247 and 248 to be thrown radially outward, and from the plate 241, the fluid circulates downwardly as indicated by the arrows in FIG. 2. The fluid circulates through and around the members forming the thrust bearing 230, between the radial bearing 173 and the shafts 174, through axial passageways 249 formed in the member 162 adjacent the radial bearing 173, around the outside of the coupling 176, through the holes 178 formed through the coupling 176, the holes 178 being radially aligned with the space 177 between the adjacent ends of the shaft 174 and the rotor shaft 51 of the motor module 21, then upwardly through the bore 246 to the passageways 247. The labyrinth seal 179 formed on the member 162 below the holes 178 of the coupling 176, prevents the fluid which circulates through the thrust bearing assembly 230 from circulating downwardly in the upper motor module 21, as previously explained with regard to the labyrinth seal 88 of the connecting members 27, 28 and 29.

Above the thrust bearing assembly 230 and within the casing 160, there are provided rotary shaft seals and a pressure equalizing apparatus. The shaft 174 of the module 20 extends upwardly through the upper end closure member 161, and a radial bearing 256 for the shaft 174 is positioned within a central bore 255 of the member 161 which receives the shaft 174. At the upper end surface of the member 161 may be provided a device 257 such as a sand slinger for preventing sand or other particles from entering the interior of the module 20 around the shaft 174. The axially extending bore 255 which receives the shaft 174 is enlarged as at 261 above the radial bearing 256, and two rotary shaft seals 258 and 259 are provided within the enlarged seal cavity 261. The rotary shaft seals 258 and 259 may be conventional structures, and each comprises one member which is fastened to the closure member 161 and extends around the shaft 174, and another member which is fastened to and extends around the shaft 174. The two members of each of the shaft seals have radially extending surfaces which are in sliding contact as the shaft 174 rotates. The engagement of the two radial sealing surfaces of each shaft seal thus prevents leakage of fluid between the shaft 174 and the enclosure member 161. The members of each of the shaft seals 258 and 259, which is mounted on the closure member 161 is held against axial movement, and the members of the seals, which are fastened to the shaft 174 are urged toward the associated stationary member by a compression spring 262 which is positioned between the two seals 258 and 259.

Figure 10:
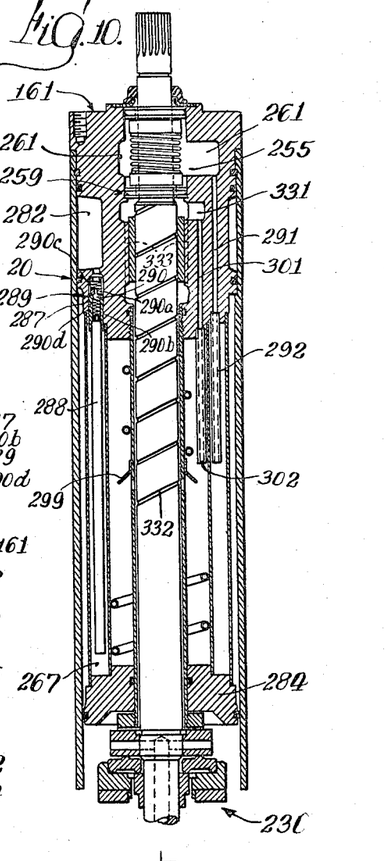
FIG. 10 is a fragmentary sectional view taken on the line 10—10 of FIG. 5.
Figures 10A, 12:
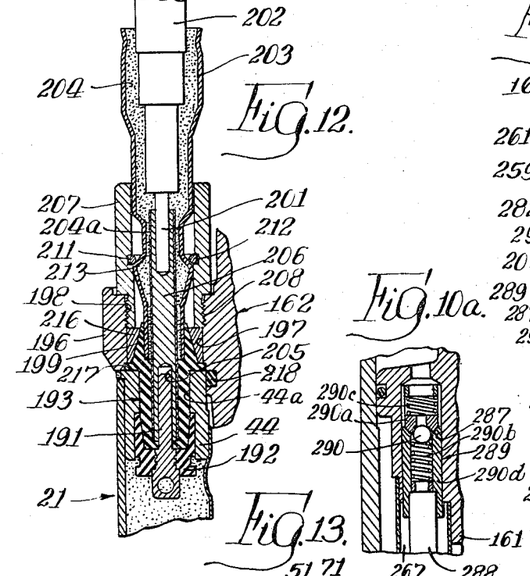
FIG. 10a is an enlarged sectional view of a portion of the structure shown in FIG. 10.
FIG. 12 is another fragmentary enlarged sectional view of a portion of the structure shown in FIG. 2.
Figure 14:
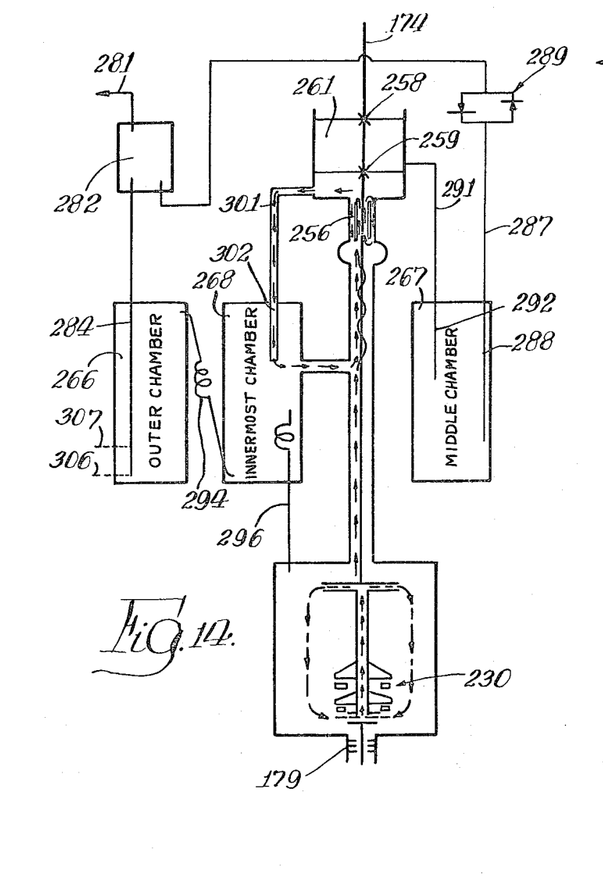
FIG. 14 is a schematic diagram showing the operation of a portion of the assembly.

With reference to FIGS. 2, 10 and 14, the pressure equalizing apparatus comprises three concentric chambers 266, 267 and 268. The outermost chamber 266 is formed by the cylindrical casing 160 and a first cylindrical tube 271, the second or intermediate chamber 267 is formed by the tube 271 and a second cylindrical tube 272, and the innermost chamber 268 is formed by the tube 272 and a sleeve 273 which extends around the shaft 174. The tube 271 is arranged concentrically within the casing 160, the tube 272 is arranged concentrically within tube 271, and the sleeve 273 is arranged concentrically within the tubes 271 and 272. At the upper ends, the two tubes 271 and 272 are connected in fluid tight relation to the upper end closure member 161, and at their lower ends, the tubes 271 and 272 engage in fluid tight relation, a center closure member 274. The sleeve 273 includes externally threaded end portions, and the upper threaded end portion is screwed into an internally threaded lower portion of the bore 255 of the upper closure member 161. The lower end of the sleeve 273, and the shaft 174, extend through an internal bore formed in the center closure member 274, and a nut 276 is threaded on the lower and threaded portion of the sleeve 273. The sleeve 273 also makes fluid tight connections with the upper closure member 161 and the center closure member 274 by O-ring seals 277 and 278. Thus, when the nut 276 is tightly threaded on the lower end of the sleeve 273, the two tubes 271 and 272 are tightly compressed at their ends against the upper closure member 161 and the center closure member 274, to provide fluid tight connections.

The outermost chamber 266 is vented to the exterior of the assembly through a passageway 281 and a gas separation chamber 282, which connects with the passageway 281, and another passageway 283, the passageways 281 and 283 and the chamber 282 being formed in the upper closure member 161. A tube 284 extends vertically from the passageway 283 of the upper closure member 161 to a passageway 286 formed in the center closure member 274, the passageway 286 opening into the bottom of the outer chamber 266.

The chamber 282 is also connected to the bottom of intermediate chamber 267 by means of a passageway 287 (FIGS. 10 and 10a) formed in the upper closure member 161, and a tube 288 which is fastened to the upper member 161 at the passageway 287. The tube 288 extends downwardly in the chamber 267 from the upper closure member 161 and terminates a short distance above the center closure member 274. Within the passageway 287 of the member 161 is positioned a two-way check valve 289 including a movable ball 290 and a movable ball seat 290a. Compression springs 290b and 290c engage the ball 290 and the ball seat 290a and urge them together. A sleeve 290d is also provided, and the ball seat 290a is adapted to seat on a shoulder formed in the sleeve 290d.

When the ball 290 engages the seat 290a and the seat 290a engages the shoulder in the sleeve 290d, the valve 289 prevents fluid flow through the passageway 287 in either direction. If the pressure within the chamber 267 exceeds the external pressure by a predetermined amount, the spring 290c is compressed and the ball seat 290a moves off its seat on the shoulder in the sleeve 290d, which permits fluid flow upwardly through the passageway 287. On the other hand, if the external pressure is greater than the internal pressure by the predetermined amount, the compression spring 290b is compressed and ball 290 moves off of the seat 290a, which permits fluid flow downwardly through the passageway 287. As will be explained hereinafter, the predetermined pressure at which the check valve 289 opens is relatively low, such as 5 to 10 p.s.i., so that it will open to permit fluid flow caused by thermal expansion and contraction but will be closed to fluid flow caused by a seal failure and a consequent pumping action.

The seal cavity 261 for the rotary shaft seals 258 and 259 also opens into the intermediate chamber 267, by means of a passageway 291 (FIG. 10) formed in the upper closure member 161, the passageway 291 extending from the cavity 261 downwardly to a tube 292 which is secured to the closure member 161 in the passageway 291. The tube 292 extends from the lower surface of the upper closure member 161 downwardly to approximately the axial midpoint of the intermediate chamber 267.

The outermost chamber 266 is connected to the innermost chamber 268 through a passageway 293 (FIG. 2) formed in the upper closure member 161, one end of the passageway 293 opening into the top of the chamber 266 and the other end of the passageway 293 being connected to a tube 294 which extends from and is connected to the closure member 161 in the passageway 293. The tube 294 extends downwardly and spirals around the sleeve 273 and the shaft 174 within the innermost chamber 268. The coil 294 makes approximately two and one half loops around the shaft 173, and, at approximately the axial midpoint of the chamber 268, the tube 294 extends straight downwardly to approximately the lower end of the innermost chamber 268.

The innermost chamber 268 is also connected to the chamber which contains the multiple thrust bearing assembly 230, by means of a coil 296 (FIG. 2) and a passageway 297 formed in the center closure member 274. The passageway 297 extends vertically through the lower closure member 274, and the coil 296 is connected to the closure member 274 in the passageway 297. The coil 296 spirals upwardly around the sleeve 273 and the shaft 174 for approximately two complete revolutions, and the coil 296 terminates at approximately the axial midpoint of the innermost chamber 268. The diameter of the spiraled portion of the coil 296 is larger than the diameter of the spiraled portion of the coil 294, and a portion of the coil 294 extends downwardly between the outer periphery of the sleeve 273 and within the spiral of the coil 296, as shown in FIG. 2.

A plurality of circumferentially spaced, radially extending holes 298 formed through the sleeve 273 at approximately the axial midpoint of the sleeve 273. The holes 298 place the innermost chamber 268 in communication with a narrow annular space which is provided between the shaft 174 and the inner periphery of the sleeve 273. A shroud 299 is preferably fastened to the sleeve 273 over each of the holes 298 formed through the sleeve 273.

In addition, the portion of the bore 255 formed in the upper closure member 161, just below the lower rotary shaft seal 259, is connected to the innermost chamber 268 by means of a passageway 301 (FIG. 10) which extends vertically through the upper closure member 161 from the bore 255 downwardly to the lower surface of the upper closure member 161. A tube 302 is secured to the upper closure member 161 in the passageway 301, and extends downwardly to substantially the axial midpoint of the innermost chamber.

The purpose of the pressure equalizing apparatus is to permit the cooling and lubricating fluid within the modular assembly to expand and contract, due to alternate heating and cooling during operation, without causing excessive strain on the rotary shaft seals 258 and 259. Pressure equalization is accomplished by venting the internal fluid to the ambient or external fluid at the exterior of the modular assembly. Since the internal fluid is usually lighter than the external fluid, a simple venting arrangement would quickly result in displacement of the internal fluid by the heavier external fluid, which would be disadvantageous because the external fluid would be harmful or distructive to the bearings of the assembly. In addition, extensive interchange of fluid due to expansion and contraction of the internal fluid would cause gas which is normally contained in the external well fluid, to be drawn into the upper auxiliary module 20. Gas within the module 20 would cause the bearings to run without lubrication which would of course rapidly lead to failure of the bearings.

With particular reference to FIG. 14, the outermost chamber 266 and the innermost chamber 268 are provided to allow for expansion and contraction of the internal fluid but to prevent a substantial interchange between the internal and external fluids, and also to prevent transmission of gasses from the exterior of the assembly to the interior. The connection between the exterior and the interior of the module 20 is through the cavity 282 and the tube 284 to the bottom of the uppermost chamber 266. The chamber 282 serves as a gas separator so that passage of fluid into and out of the outermost chamber 266 due to expansion and contraction of the internal fluid will not pull in a new supply of gas from the well for each cycle. The upper end of the outermost chamber 266 is connected to the lower end of the innermost chamber 268 through the spiraled coil 294. Since the innermost chamber 268 is connected to the thrust bearing chamber through the coil 296, and the thrust bearing chamber is connected to the interior of the motor module 21 through the labyrinth seal 179, the chambers 266 and 268, the thrust bearing chamber, and the interior of the motor module 21 will all be at the pressure of the external well fluid. As previously explained, the other motor modules 22 and 23 are connected through labyrinth seals similar to the seal 179, and, therefore, the internal pressure of the modules 22 and 23 will also be at the pressure of the external well fluid.

Before the assembly is lowered into a well, the interior of the assembly is completely filled with a cooling and lubricating fluid as will be explained hereinafter. As soon as the assembly is lowered into a well and submersed in the well fluid, if the external well fluid is heavier than the internal fluid, which is usually the case, the heavier external fluid flows downwardly through passageway 281, the cavity 282, the passageway 283, the tube 284, the passageway 286 and to the bottom of the outermost chamber 266. Flow of the external fluid into these areas will of course displace the internal fluid which flows out of the module 20 through the passageway 281. Internal fluid will continue to be displaced until the external fluid in the outermost chamber 266 reaches approximately the level indicated by the line 306 in FIG. 14, which is the level of the lower end of the tube 284.

When the motor modules are operated for the first time, the internal fluid becomes heated due to operation of the motors and expands. During expansion, first the external fluid in the passageway 286, the tube 284, passageways 283 and 281 and the cavity 282 will be expelled, as well as some of the external fluid at the bottom of the outermost chamber 266. Continued expansion also causes some of the internal fluid to be expelled. When the motor assembly is subsequently deenergized, contraction of the fluid due to cooling will cause the internal fluid in the described passageways to flow back into the module 20, and, in addition, an amount of external fluid will follow the internal fluid. After a number of cycles of operation, the level of the external fluid at the bottom of the outermost chamber 266, when the assembly is deenergized will rise to approximately the level indicated by the line 307 (FIG. 14).

Thereafter, cycles of expansion and contraction will not result in the loss of additional internal fluid, and the external fluid in the outermost chamber 266 will vary approximately between the levels indicated by the lines 306 and 307.

While a new supply of external fluid is brought into the module during each cycle, the flow of the fluid is at a relatively slow rate, and, therefore, any gas entrapped in the external fluid will have time to separate out in the cavity 282 and escape upwardly through the passageway 281. Moreover, the volume of the external fluid in the outermost chamber 266 is relatively large and therefore most of the external liquid within the outermost chamber 266 will have been there previously and consequently will be free of gas. This arrangement therefore greatly reduces the amount of entrapped gas brought into the outermost chamber 266, and furthermore, any gas entering the outermost chamber 266 will immediately rise to the top of the chamber 266. Since the innermost chamber 268 is interposed between the outermost chamber 266 and the chamber for the thrust bearing assembly 230, and since the chambers 266 and 268 are connected by the coil 294 which extends from the top of the outermost chamber 266 to the bottom of the innermost chamber 268, gas cannot travel from the outermost chamber 266 to the innermost chamber 268 because the relatively light gas would have to travel downhill. Therefore, chamber 266 and coil 294 act as a second gas trap.

In the event that the outermost chamber 266 should somehow become filled with the external well fluid, a certain amount could spill over into the innermost chamber 268 through the coil 294, but from then on the passage of the external fluid into and out of the innermost chamber 268 would be similar to the passage of fluid into and out of the outermost chamber 284 during initial start-up operations as previously described. If a small amount of gas were entrapped in the external fluids spilled over into the innermost chamber 268, the gas would immediately rise to the top of the innermost chamber 268 which therefore would act as another gas trap and prevent the gas from entering the chamber for the thrust bearing 230, through the coil 296. Since the uppermost end of the coil 296 is spaced a considerable distance from the upper end of the innermost chamber 268, a considerable amount of gas would have to enter the innermost chamber 268 before any of it would be forced into the chamber 230 for the thrust bearing assembly 238.

The two rotary shaft seals 258 and 259 are provided as described to give greater protection than would be obtained by the use of only one shaft seal. When using two shaft seals, however, the space between the shaft seals should be at the pressure of the external well fluid to prevent excessive strain on the seals due to differences between a high external fluid pressure and a lower fluid pressure between the seals, if such were the case. For this reason, the intermediate chamber 267 is provided, which opens into the space 261 between the shaft seals 258 and 259 through the passageway 291 and the tube 292. The space 261 between the shaft seals 258 and 259 should not be connected directly to the exterior of the assembly because it would become filled with external fluid, and shaft seal 258 would then be completely bypassed and serve no purpose. The cavity 261 for the rotary shaft seals, the intermediate chamber 267, and the passageways 291 and 292 are initially filled with the internal fluid, and the interior of the chamber 267 is vented to the outside of the assembly through the tube 288 and the check valve 289 in the passageway 287 which leads to the passageway 281. A small amount of external well fluid may pass into the intermediate chamber 267 during initial startup operation if there is thermal expansion and contraction of the fluid in chambers 261 and 267, similar to the procedure described with regard to the entrance of external fluid into the outer chamber 266.

The provision of the spiraled portions of the coils 294 and 296 is important because the assembly may be laid on its side without damage. After being filled with internal fluid, and having some external fluid within the module 20 if the assembly were rolled over once or twice, the external fluid would reach the thrust bearing assembly if it were not for the spiraled portions of the coils 294 and 296.

The module assembly initially is filled with the cooling and lubricating fluid from the bottom. This is accomplished by removing the plug 147 in the cap 142 of the lower end termination unit 24, and gradually raising the level of the fluid within the assembly so as not to form any air traps. To permit air within the assembly to escape during the filling operation, plugs 311 and 312 (FIGS. 2 and 11) are provided in the upper end closure member 161 of the module 20. With reference to FIG. 2, the plug 311 is screwed into a hole 313 formed in the member 161, and the hole 313 is connected by passageways 314 and 316 to the chambers 267 and 268, respectively. The hole 313 is also connected by a passageway 317 to the cavity 261 for the two rotary shaft seals 258 and 259. Therefore, removal of the plug 311 permits air to escape from the chambers 267 and 268, and the cavity 261. Air from the motor modules 21, 22 and 23 rises upwardly to the chamber containing the multiple thrust hand assembly 230, and this air enters the innermost chamber 268 through the coil 296. The holes 298 formed in the sleeve 273 permit fluid and air to pass into and out of the annular space between the shaft 174 and the sleeve 273.

The plug 312 (FIG. 11) is screwed into a threaded hole 321 formed in the member 161. The hole 321 is connected by a passageway 322 to the outermost chamber 266, and by a chamber 323 to the space around the shaft 174 below the lowermost rotary shaft seal 259. The plug 312 is elongated and extended into the passageway 322. Therefore, when the plug 312 is removed, the upper end of the outermost chamber 266 and the space below the rotary shaft seal 259 are vented.

Figure 11:
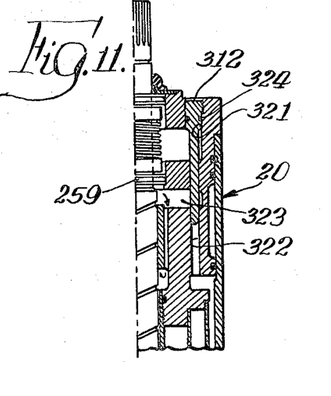
FIG. 11 is a fragmentary sectional view taken on the line 11—11 of FIG. 5.

Each of the plugs 311 and 312 include an O-ring seal 324 which prevents external well fluid from entering the holes 321 and 313 when the plugs 311 and 312 are in place. The plug 311 is also shaped to separate passageways 317, 314 and 316 from each other, and the plug 312 is shaped to separate the passageways 322 and 323 from each other.

The cavity 282 and the lower end of the outermost chamber 284 are vented to the exterior of the assembly through the passageway 281, of course.

If refilling of the internal fluid is ever required, this more than likely will be required only in the upper auxiliary module 20. Drainage of the auxiliary module 20 may be accomplished by removing a plug 326 (FIG. 2) which is positioned in a hole formed in the casing 160 and screwed into an internally threaded hole 327 formed in the center closure member 274. The hole 327 that receives the plug 326 is in communication with passageways 328 and 329 which lead to the chambers 267 and 268, respectively, and is in communication with chamber 266 through an undercut portion 325 of the member 274. Thus, removal of the plug 326 permits drainage of fluid from the chambers 266, 267 and 268, and also fluid within the bore 255 below the lower rotary shaft seal 259, through the interior of the sleeve 273 and the holes 298. Thus, any contaminated fluid within the chambers will be drained through the hole 327, without mixture of any of the contaminated fluid with the uncontaminated internal fluid within the chamber for the multiple thrust bearing assembly 230.

For proper operation of the rotary shaft seals 258 and 259, it is necessary that the radial sleeve bearing 256 near the upper end of the shaft 174 be relatively close to the seals 258 and 259. Thus, the bearing 256 is positioned just below the rotary shaft seal 259. If any of the external well fluid should leak into the bore 255 below the rotary shaft seal 259 it would of course become mixed with the internal fluid just above the radial bearing 256. To minimize the possibility that the external fluid may cause damage to the radial bearing 256, the portion of the bore 255 just below the rotary seal 259 is connected to the innermost chamber 268 through the passageway 301 and the tubes 302 (FIGS. 10 and 14). The passageway 301 connects with the bore 255 adjacent the outermost wall of a radially enlarged space 331 (FIG. 10) at the lower end of the seal chamber 261. Therefore, any relatively heavy external fluid leaking through the lower bearing 259 will be thrown radially outward by centrifugal force, and will then flow downwardly through the passageway 301 and the tube 302 to the bottom of the innermost chamber 268.

To ensure that the radial bearing 256 has an adequate supply of lubricating fluid, in the event that a gas or air pocket has formed adjacent the lower edge of the radial bearing 256, the shaft 174 is provided with a peripheral spiral groove 332 (FIG. 10), which serves to pump fluid from within the sleeve 273 upwardly around the inner periphery of the radial bearing 256 to the portion of the bore 255 below the lower rotary shaft seal 259. Axially extending grooves 333 are formed in the member 161 at the outer periphery of the radial bearing 256, and the lubricating fluid which flows upwardly around the inner periphery of the radial bearing 256, flows radially outward at the upper edge of the bearing 256 and then downwardly through the axial grooves 333 to the bottom edge of the bearing 256, where the fluid then returns upwardly through the spiral grove 332 as indicated by the arrows in FIG. 2.

During operation, if shaft seal 258 fails and there is a tendency for it to pump fluid in the downward direction, flow of fluid due to such a tendency to pump would be prevented by the valve 289. Fluid pressure caused by a pumping action of one of the seals 258 and 259 would be relatively low, and the opening pressure of the check valve 289 is chosen such that the valve would be closed at the low pumping pressure. Consequently, seal 258 could not pump fluid downwardly into the chambers 261 and 267 because check valve 289 would prevent flow out of the chamber 267, such outward flow being a prerequisite to inward flow once the chamber 267 has been filled with fluid.

Similarly, a tendency of the seal 258 to pump fluid upwardly upon failure would be prevented by the valve 289 because it would prevent fluid from entering the chamber 267 to replace the pumped fluid.

If seal 259 were to fail and tend to pump fluid in either direction, such a tendency would require fluid flow through the pasageways 291 and 287, which of course is prevented by the valve 289.

As previously explained, the valve 289 is normally closed at the relatively low fluid pressure caused by seal pumping action, but is open at the relatively high pressure caused by thermal expansion and contraction.

Figure 15:
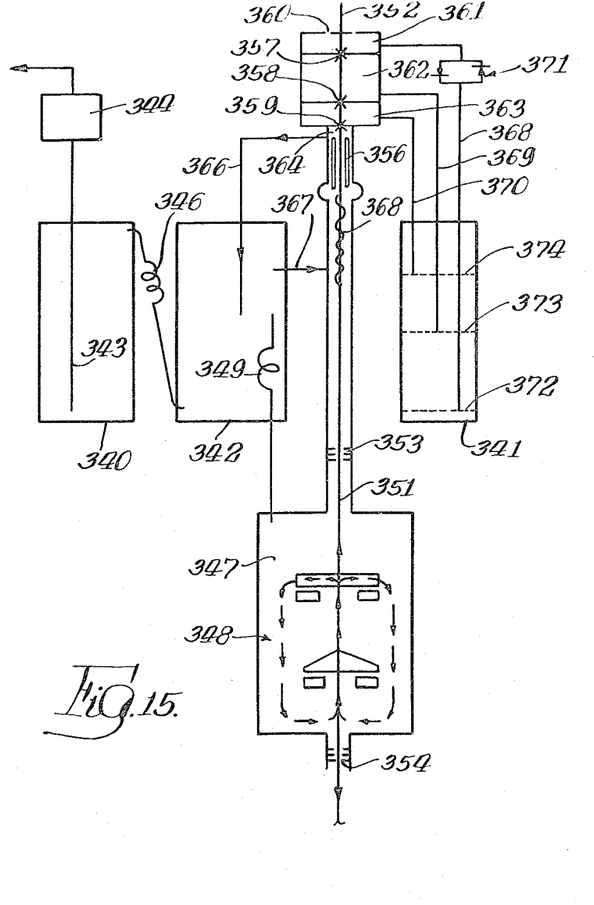
FIG. 15 is a schematic diagram similar to FIG. 14 but showing an alternate construction of a portion of the assembly.

FIG. 15 shows a modified arrangement including a rotary shaft seal, pressure equalizing and thrust bearing apparatus generally similar to that shown in FIG. 14 but including three rotary shaft seals rather than two as shown in FIG. 14. The system shown in FIG. 15 includes an outer chamber 340 an intermediate or middle chamber 341, and an innermost chamber 342. The outermost chamber 340 is connected to the exterior of the module by means of a tube 343 and a gas separator chamber 344, and the two chambers 340 and 342 are connected by means of a spiral coil 346. The innermost chamber 342 is connected to a chamber 347 which houses a multiple thrust bearing assembly 348, by means of a spiral coil 349.

The module includes a shaft 351 which extends through the module and may be connected at its upper end 352 to a unit such as a pump to be driven, and the shaft 351 extends downwardly through the multiple thrust bearing assembly 348 to one or more motor modules (not shown). Labyrinth seals 353 and 354 are provided on both sides of the thrust bearing assembly 348, for preventing the fluid circuilated through the multiple thrust bearing 348 from substantially mixing, during operation, with the fluids on both sides of the multiple thrust bearing 348.

Adjacent the upper end of the shaft 351 is provided a radial sleeve bearing 356, and between the bearing 356 and the upper end 352 of the shaft are provided three rotary shaft seals 357, 358 and 359. Above the seal 357 is provided a chamber 361 which is open as at 360 to the exterior of the module; between the seals 357 and 358 is a chamber 362; and between the seals 358 and 359 is a chamber 363. A chamber 364 is also provided between the lowermost shaft seal 359 and the radial bearing 356, and a tube 366 connects the chamber 364 with the interior of the innermost chamber 342. Another tube 367 connects the chamber 342 to the space below the radial bearing 356, the tube 367 preferably being located adjacent the upper end of the chamber 342 and the lower end of the tube 366 preferably being at approximately the axial midpoint of the chamber 342. Spiral grooves 368 are preferably formed in the outer periphery of the shaft 351 for the purpose of pumping fluid upwardly from the tube 367 to the radial bearing 356, where it flows into the chamber 364 and then downwardly through the tube 366 to the innermost chamber 342, thus completing the circulation path around the radial bearing 356.

The three chambers 361, 362 and 363 are respectively connected by tubes 368, 369 and 370 to the interior of the middle chamber 341. Again, a two way check valve 371, which may be identical with the valve 289 is positioned in the passageway 368. The fluid within the middle chamber 341 is isolated from the remainder of the internal fluid in the module containing the apparatus shown in FIG. 15. The interior of the middle chamber 341 is vented to the exterior of the module by the tube 368 and the check valve 371. The lower end of the tube 368 terminates adjacent the lower end of the middle chamber 341, and the relatively heavy external fluid will displace a portion of the internal fluid in the chamber 341 and rise approximately to the level indicated by the line 372 if there is thermal expansion and contraction of the internal fluid as previously explained. The lower end of the tube 369 terminates at the level indicated by the line 373, and the lower end of the tube 370 terminates at the line indicated by the numeral 374, the line 373 being intermediate the lines 372 and 374.

Assuming that the chambers and passageways shown in FIG. 15 are initially filled with a relatively light internal fluid, a portion of the internal fluid in the outermost chamber 340 will be displaced during initial operation as described previously with regard to the outermost chamber 266 shown in FIG. 14. The operation of the portion of the system shown in FIG. 15 including the chambers 340 and 342 and 347 is similar to the operation of the portion of the apparatus shown in FIG. 14 including the chambers 266, 267 and 268. As previously mentioned, a portion of the internal fluid in chamber 341 may also be displaced, but the external fluid entering chamber 341 cannot under normal operation reach the chambers 362 and 363 between the shaft seals 357, 358 and 359 because the tubes 369 and 370 terminate above the level 372.

In the event rotary shaft seal 357 fails and the seal 357 tends to pump fluid upwardly or out of the module, the internal fluid within the chamber 341 would tend to be pumped upwardly through the tube 369 and out of the module through the seal 357 which fluid would have to be replaced by external relatively heavy fluid entering the chamber 341 through the tube 368. However, such fluid flow is prevented by the check valve 371. If on the other hand, failure of the seal 357 tended to pump the relatively heavy external fluid downwardly through the seal 357 around the shaft 352, fluid flow upwardly out of the passageway 368 would also be required, but such flow would be prevented by the check valve 371.

In the event seal 358 were to fail before the seal 357, a pumping action in either direction would result in circulation of the internal fluid through tubes 369 and 370 and the chambers 341. The innermost seal 359 nearly always is the last of the three seals to fail, and therefore it provides protection for the bearings of the assembly even after failure of seals 357 and 358. In the event seal 359 were to fail before seals 357 and 358, a pumping action in either direction would require fluid flow through passageway 370. This is prevented however by the check valve in passageway 368. Of course, fluid would not flow through passageway 369 without prior failure of one of the seals 357 and 358.

Thus, in the system shown in FIG. 15, as in the system shown in FIG. 14, in the event of failure of any of the seals, any pumping action tending to pump internal fluid to the outside of the system is prevented by the check valve. Nevertheless, the pressure at which the check valve is calibrated to open and close would not interfere with the normal fluid flow due to thermal expansion and contraction.

Figure 16:
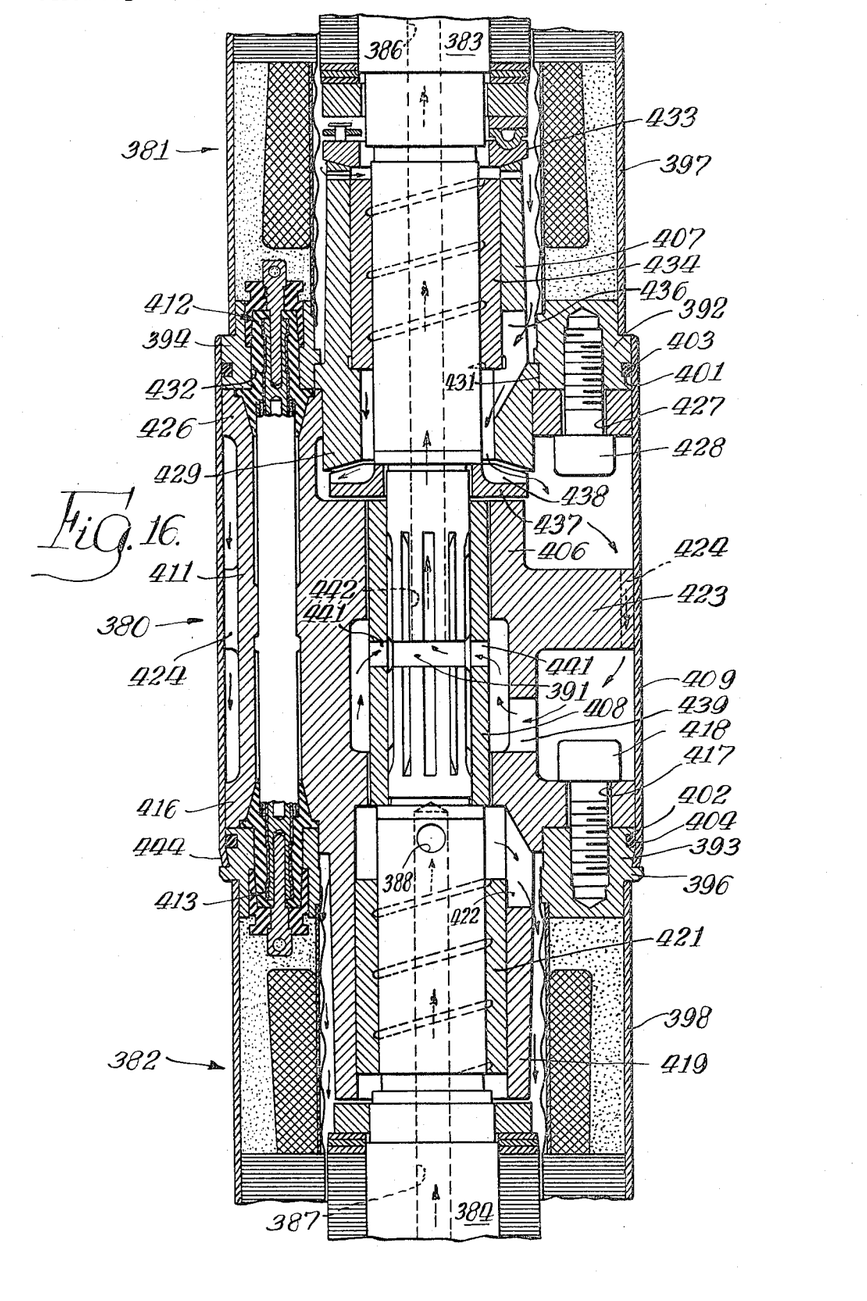
FIG. 16 is a sectional view similar to FIG. 13 but showing an alternate construction.

FIG. 16 shows a connector member 380 which is an alternate construction for the members 27, 28 and 29 (FIG. 1). The connecting member 380 is shown as connected between the two motor modules 381 and 382 which are generally similar to the motor modules 21, 22 and 23. The modules 381 and 382 respectively include rotor shafts 383 and 384, the shaft 383 having an axial bore 387 formed therein which terminates at a location which is spaced from the upper end of the shaft 384. Radially extending holes 388 are formed in the shaft 384 adjacent the upper end of the bore 387, the holes 388 extending from the bore 387 to the exterior surface of the shaft 384. The adjacent ends of the two shafts 383 and 384 are spaced a short distance apart to form a passageway 391 between them.

The modules 381 and 382 include annular end rings 392 and 393, respectively, which differ from the end rings 44 and 46 in that the end rings 392 and 393 have flange portions 394 and 396 which extend radially outwardly over the end edges of the casings 397 and 398 of modules 381 and 382. Annular grooves 401 and 402 are formed in the outer periphery of the end rings 392 and 393, the annuluar grooves 401 and 402 receiving O-ring seals 403 and 404, respectively.

The connecting member 380 comprises a body portion 406, an upper bearing support portion 407, a sleeve type coupling 408 and a casing 409. The member 380 also includes a plurality of electrical connector structures 411 which may be the same as the corresponding structures of the members 27, 28 and 29.

The body portion 406 includes a radially outward extending flange 416 which has holes 417 formed therethrough, the holes 417 receiving bolts 418 for securing the portion 406 to the end rings 393 of the lower module 382. The lower end of the portion 306 extends downwardly into the rotor cavity of the module 382 and includes a downwardly extending projection 419 which supports a sleeve type radial bearing 421 for the upper end of the rotor shaft 384 of the lower module 381. Holes 422 are formed through the projection 419 through which fluid passes for the purpose of cooling and lubricating the motor module 382. From the flange 416, the portion 406 extends upwardly around the coupling 408, and at substantially the axial center of the member 380, the portion 406 has formed thereon a radially outwardly extending flange 423 which engages the inner periphery of the cylinder 409 and provides support therefor. Vertically extending slots of grooves 424 are formed in the outer periphery of flange 423, through which fluid may flow as will be explained hereinafter.

The portion 406 also includes a radially outwardly extending flange 426 at its upper end, the flange 426 engaging the end ring 392 of the motor module 381. The flange 426 has axially extending holes 427 formed therethrough, which receive bolts 428 for the purpose of securing the flange 426 to the end ring 392.

The upper bearing support portion 407 includes a portion 429 which extends downwardly into the bore of the body portion 406, and the portion 407 is supported by the body portion 406. The inner periphery of the end ring 392 is rabbeted at 431, and the portion 429 includes a flange 432 which extends into the rabbet 431 and is compressed therein by the flange 426 of the lower portion 406. Thus, the act of tightly screwing the bolts 428 into the end ring 392 serves both to secure the body portion 406 to the motor module 381 and also to secure the upper portion 407 to the module 381.

The bearing support portion 407 of the member 380 extends upwardly into the rotor cavity of the module 381 and, its upper end, supports a thrust bearing 433. At its inner periphery, the portion 407 supports a radial bearing 434, which is similar to the bearing 421, for the lower end of the rotor shaft 383 of the motor module 381. The portion 407 also has openings 436 formed therethrough, through which cooling and lubricating fluid for the motor module 381 flows through operation.

As in the motor modules 21, 22 and 23, the coupling 408 of the member 380 is preferably secured as by press fit to the lower end of the rotor shaft 383 of the motor module 381.

Secured to the rotor shaft 383 adjacent the upper edge of the coupling 408, is an impeller plate 437. The plate 437 has vanes 438 formed thereon, which receive downwardly flowing fluid from the openings 436 and throw the fluid outwardly, thereby acting as a centrifugal pump. From the impeller plate 437, the fluid flows outwardly and downwardly through passageways 424 formed between the flange 423 and the inner periphery of the cylinder 409, radially inward through openings 439 formed in the member 406 adjacent the flange 416, then upwardly to holes 441 formed radially through the sleeve coupling 408, the holes 441 being radially aligned with the passageway 391 between the adjacent ends of the rotor shaft. From the passageway 391, the fluid flows upwardly through the axial bore 442 formed through the rotor shaft 383 to radially extending holes (not shown) which are similar to the holes 56 and 54 formed in the rotor shaft 51 of the motor module 22. The fluid then flows downwardly through the narrow annular space between the outer periphery of the rotor of the motor 381 and the liner, through and around the thrust bearing 433, and through the openings 436 to the impeller plate 437, thus completing the circulation path.

The apparatus shown in FIG. 16 may be assembled by first securing the portions 406 and 407 of the member 380 to the motor modules 381 and 382, along with the shaft coupling 408 and the electrical connectors 411. After the portions 406 and 407 have been bolted to the end rings 392 and 393, the casing 409, which has a larger diameter than the casings 397 and 398 of the motor modules, is slipped over the motor modules 381 and over the outer periphery of the flanges 426, 423 and 416 and over portions of the end rings 392 and 393. The end rings 393 includes an annular recess 444 in its outer periphery, and the lower edge of the casing 409 is crimped into the recess 444 in order to secure the casing 409 to the end ring 393. O-ring seals 403 and 404 provide a fluid tight connection between the end rings 393 and 392 and the sleeve 409.

From the above description, it will be seen that the assembly comprises a plurality of identical motor modules and a plurality of identical connector members, each motor module being sealed and the electrical connectors in each connector member being sealed so that they may be submerged in external fluid without the necessity of a separate outer casing for the assembly. Thus the horsepower rating of the assembly may be readily changed merely by adding or subtracting a standardized motor module without having to provide a different length casing. Also, a defective motor module may be replaced without the necessity of first removing an outer casing for the assembly. Another feature of the assembly is that the motor modules have separate fluid circulation systems but, nevertheless, one pressure equalizing apparatus in the auxiliary module serves to equalize pressure throughout the assembly.

We claim:

1. A submersible modular motor assembly comprising at least two electric motor modules releasibly connected together at their adjacent ends in vertically stacked end-to-end relation for operation in unison, an end termination member releasibly connected to the remote end of one of said motor modules, all of the electric motor modules of said assembly being identical, means releasibly connected to the remote end of the other of the motor modules for connecting the motor modules to a device to be driven, each of said motor modules and said end termination member having its own casing, said casings being sealed against entry of submersing fluid, whereby each motor module may be readily disconnected from the other motor module or from said means or from said end termination member to permit replacement of the motor module or the addition to or subtraction from the assembly of a motor module.

2. An assembly as in claim 1, including at least two identical connector members, one connector member being interposed between said motor modules for connecting them together, the other of said connector members being interposed between said end termination member and said one motor module, each of said connector members containing electrical connections for establishing an electrical circuit through said motor modules, and each of said connector members sealing the electrical connections therein against entry of submersing fluid.

3. A submersible modular motor assembly comprising at least two identical electric motor modules releasibly connected together at their adjacent ends in vertically stacked end-to-end relation, a lower end termination member, and at least two identical connector members, one of said connector members connecting the adjacent ends of said motor modules together and another of said connector members connecting the lower end of the lowermost motor module to said lower end termination member, and an auxiliary module secured to the upper end of the upper motor module, and adapted to connect the assembly to a device to be driven, each motor module having a thrust bearing for carrying the thrust of said motor module, and said auxiliary module having a thrust bearing carrying the thrust of said auxiliary module and the device driven by said assembly.

4. A submersible modular motor assembly comprising at least two identical electric motors, first means for connecting adjacent ends of said motors together in vertically stacked end-to-end relation for operation in unison, an end termination member, second means for connecting the remote end of one of said motors to said termination member, said first and second means being identical, and an auxiliary module connected to the remote end of the other of said motors, said auxiliary module being adapted to connect the assembly to a device to be driven.

5. A submersible modular motor assembly comprising at least two electric motor modules connected together at their adjacent ends in vertically stacked end-to-end relation for operation in unison, each of said motor modules including a casing which forms an enclosure sealed against the entry of submersing fluid, each of said motor modules being adapted to be filled with a cooling and lubricating fluid and each of said motor modules having pump means for circulating said cooling and lubricating fluid through said motor module, said modules maintaining the fluid in each module substantially separate from the fluid in the other module.

6. An assembly as in claim 5, wherein each of said motor modules includes a rotatable rotor shaft, said rotor shaft of each of said modules being hollow throughout at least a portion of its length to form an axial bore, and said axial bore comprising a portion of the circulation path of said fluid for each of said modules.

7. An assembly as in claim 5, wherein a seal is provided for each module to maintain the fluid in each module substantially separated from the fluid in the other of said modules.

8. An assembly as in claim 5 and further including connecting means associated with each of said modules, each of said connecting means including walls forming passageways through which the cooling and lubricating fluid of the associated module flows, at least some of said walls forming fins at the outside of said connecting means, whereby said walls act as heat exchangers for transferring heat from said cooling and lubricating fluid to the exterior of the assembly.

9. An assembly as in claim 8, wherein, each of said connecting means further includes a seal for maintaining said fluids of said modules substantially separated.

10. An assembly as in claim 8, wherein each of said modules includes a rotatable rotor shaft, and each of said connecting means further includes a sleeve coupling for connecting the adjacent ends of the rotor shafts together, said passageways extending both internally and externally of said sleeve coupling, and each of said couplings having radially holes formed therethrough, said holes thus being in communication with said passageways, whereby said fluid may flow through said holes.

11. A submersible modular motor assembly comprising at least two electric motor modules connected together at their adjacent ends in vertically attached end-to-end relation for operation in unison, each of said modules including a rotatable rotor shaft, a sealed outer housing, each of said modules being adapted to be filled with a cooling and lubricating fluid, each of said rotor shafts having an axial bore extending from its lower end upwardly to a location spaced from the upper end thereof, each of said rotor shafts further having a first radially extending hole formed therethrough from the outer surface of said shaft to said bore, and a second radially extending hole formed therethrough from the outer surface of said shaft to said bore, said second hole being spaced a greater distance from the upper end of said rotor shaft than said first hole, pump means secured to each of rotor shafts adjacent said second hole for circulating said fluid through each of said motors upon operation of said motors, means for connecting said modules together, said connecting means forming sealed connections between said housings and having passageways formed therethrough for the flow of said fluid, each of said connecting means further including a sleeve coupling for connecting said rotor shafts of adjacent modules together for rotation in unison, said couplings connecting said rotor shafts together with the adjacent ends of said rotor shafts spaced apart to form a radial fluid passageway between said adjacent ends, said couplings each having a hole formed therethrough adjacent said ends of said rotor shafts for the passage of said fluid to said radial passageway, each of said connecting means further including a labyrinth seal for preventing a substantial interchange of said fluid between adjacent motor modules, said pump means of each module causing fluid to circulate downwardly therefrom around the outside of said rotor and into the lower adjacent connecting means, radially inwardly through said hole in said coupling through said radial passageway formed between said adjacent ends of said rotor shafts and upwardly through said axially extending bore of said rotor shaft to said second hole, said pump means also causing fluid to flow upwardly therefrom through said motor to said first hole, inwardly through said first hole to said axially extending bore, and then downwardly through said axially extending bore to said second hole.

12. A submersible modular assembly comprising at least two electric motor modules, an auxiliary module, and an end termination member, first means for connecting adjacent ends of said motor modules together in vertically stacked end-to-end relation, second means for connecting the remote end of one of said motor modules to said end termination member, said auxiilary module being connected to the remote end of the other of said motor modules, said auxiliary module being adapted to connect the assembly to a device to be driven, each of said motor modules comprising a stator and a rotor, and the construction of the upper end of said end termination member being identical with the construction of the upper end of said stator of each of said motor modules.

13. An assembly as in claim 12, wherein said motor modules, said connecting means and said end termination member form a sealed enclosure which is adapted to be filled with a cooling and lubricating fluid, and said end termination member includes a removable plug which may be removed for the purpose of filling the enclosure with said cooling and lubricating fluid.

14. A submersible modular motor assembly comprising at least two electric motor modules, an auxiliary module, and an end termination member, first means for connecting adjacent ends of said motor modules together in vertically stacked end-to-end relation, second means for connecting the remote end of one of said motor modules to said end termination member, said auxiliary module being connected to the remote end of the other of said motor modules, said auxiliary module being adapted to connect the assembly to a device to be driven, the construction of the lower end of said auxiliary module being substantially identical with the construction of the lower end of each of said connecting means.

15. A submersible modulator motor assembly comprising at least two identical electric motors, first means for connecting adjacent ends of said motors together in vertically stacked end-to-end relation for operation in unison, an end termination member, second means for connecting the remote end of one of said motors to said termination member, and an auxiliary module connected to the remote end of the other of said motors, said auxiliary module being adapted to connect the assembly to a device to be driven, said motor modules, said connecting means and said end termination member forming a sealed enclosure which is adapted to be filled with lubricating and cooling fluid, means for maintaining the fluid in each of said motor modules substantially separated from the fluid in the adjacent motor modules but transmitting fluid pressure therebetween, means for circulating said fluid in each of said motor modules, and means in said auxiliary module for equalizing the pressure of the fluid in all of said motor modules with the pressure of a submersing fluid outside of the assembly.

16. An assembly as in claim 15, wherein said auxiliary module further includes a rotatable shaft extending therethrough for connecting said motor modules to the device to be driven, a seal cavity formed in said auxiliary module adjacent said shaft, a plurality of rotary shaft seals mounted in said seal cavity around said shaft, and means for equalizing the pressure in the portion of said cavity which is between said seals with the pressure outside of said assembly, said pressure equalizing means for said seal cavity being substantially isolated from said presure equalizing means for said motor modules.

17. Means for connecting two electric motor modules together in end-to-end relation, each of said motor modules including a sealed outer casing, windings, a rotor shaft, and a cooling and lubricating fluid, said connecting means comprising a generally tubular member adapted to be secured to the casings of the motor modules in sealed relation, a coupling for connecting the rotor shafts together and means for connecting the motor windings together located in said tubular member, said member having passageways formed therein adapted to receive said fluid of at least one of the motor modules, and means on said tubular member for maintaining the fluids of adjacent motor modules substantially separated.

18. Connecting means as in claim 17, wherein said separating means comprises a labyrinth seal in said tubular member.

19. Connecting means as in claim 17, wherein said member has heat radiating fins formed thereon, said fluid passageways being formed in said fins.

20. Connecting means as in claim 17, wherein the connected ends of the rotor shafts are spaced apart, and said coupling has radially extending holes formed therethrough adjacent the connected ends of the rotor shafts, the fluid of one of the motor modules flowing through said holes to the space between said connected ends.

21. Connecting means as in claim 17, wherein said member comprises upper and lower portions which are clamped together when said member is secured to the motor modules, one of said portions being adapted to be clamped between the other of said portions and one of said motor modules.

22. Connecting means as in claim 21, and further including a tubular outer casing surrounding and secured to said member in sealed relation, said passageways being adjacent the inner periphery of said casing, whereby the fluid flows adjacent said inner periphery and said casing thereby serves as a heat exchanger.

23. Connecting means as in claim 22, wherein the inner diameter of said casing is greater than the maximum outer diameter of said motor modules, whereby said casing may be slipped over one or more of said motor modules and secured to said member of said connecting means.

24. A submersible module for use with at least one sealed liquid filled unit, comprising an outer casing, means in said casing forming first and second chambers, first fluid passageway means extending from the exterior of said casing to substantially the bottom of said first chamber, second fluid passageway means in said casing extending from substantially the top of said first chamber to substantially the bottom of said second chamber, and third fluid passageway means in said casing extending from said second chamber and adapted to extend to the exterior of said unit, said third means opening into said second chamber at a level which is spaced substantially above the bottom of said second chamber, said chambers and said passageways being adapted to be filled with a liquid the same as that filling said unit, and said second means including a spiraled coil portion.

25. A module as in claim 24, wherein said third means also includes a spiraled coil portion.

26. A submersible module for use with at least one sealed liquid filled unit, comprising an outer casing, means in said casing forming at least one equalizing chamber for equalizing the pressure within said unit with the pressure exterior of said unit, fluid passageway means in said casing extending from the exterior of said casing to said chamber, said chamber and said passageway being adapted to be filled with liquid which is substantially the same as that filling said unit, and said passageway extending upwardly above said chamber and including an enlarged portion comprising a gas separation chamber.

27. A submersible module for use with at least one sealed liquid filled unit, comprising an outer casing, means in said casing forming first and second chambers, first fluid passageway means in said casing extending from the exterior of said casing to substantially the bottom of said first chamber, second fluid passageway means in said casing extending from substantially the top of said first chamber to substantially the bottom of said second chamber, and third fluid passageway means in said casing extending from said second chamber and adapted to extend to the interior of said unit, said third means opening into said second chamber at a level which is spaced substantially above the bottom of said second chamber, said chambers and said passageways being adapted to be filled with a liquid which is the same as that filling the unit, a shaft extending through said casing, means for rotatably mounting said shaft in said casing, a seal cavity formed in said casing around said shaft, at least two rotary shaft seals mounted in said cavity and engaging said shaft, means in said casing forming a third chamber which is substantially isolated from said first and second chambers, fourth fluid passageway means in said casing extending from the exterior of said casing to substantially the bottom of said third chamber, and fifth fluid passageway means in said casing extending from the portion of said seal cavity which is between said seals to a location in said third chamber which is spaced a substantial distance above the bottom of said third chamber.

28. A module as in claim 27, wherein first, second and third seals are provided, and said fifth means comprises first and second passages, said first passage extending from the space between said first and second seals to the interior of said third chamber and said second passageway extending from the space between said second and third seals to the interior of said third chamber and terminating above the termination of said passageway formed by said fourth means, the termination in said third chamber of said first passageway being intermediate the termination of said second passageway in the termination of said passageway formed by said fourth means.

29. A module as in claim 27, and further including a radial bearing around said shaft in said casing and adjacent said seals, and means for circulating fluid from said second chamber around said bearing.

30. A module as in claim 27, wherein said first, second and third chambers are concentric.

31. A submersible module for use with at least one sealed liquid filled unit, comprising an outer casing, a shaft extending through said casing, means for rotatably mounting said shaft in said casing, a seal cavity formed in said casing around said shaft, first and second rotary shaft seals mounted in said seal cavity and engaging said shaft, a chamber formed in said casing for equalizing the pressure between such seals with the external pressure, a first passageway formed in said casing from substantially the bottom of said chamber to the exterior of said module, and a second passageway formed in said casing from the portion of said seal cavity which is between said seals to a level in said chamber which is spaced upwardly from the lower end of said first passageway which is within said chamber.

32. A module as in claim 31, and further including means in said casing forming at least one pressure equalizing chamber for the unit, said seal equalizing chamber being substantially isolated from said unit equalizing chamber.

33. A module as in claim 31, and further including a third rotary shaft seal around said shaft and spaced axially inwardly from said first and second seals, and a third passageway formed in said casing from the space between said third seal and the other seals, to a level in said chamber which is spaced upwardly from said first mentioned level.

34. A submersible modular motor assembly comprising at least two identical electric motor modules releasibly connected together at their adjacent ends in vertically stacked end-to-end relation, and connector means connecting the adjacent ends of each pair of said motor modules, each of said modules including means for circulaitng a cooling and lubricating fluid within said module and within the connecting member at the lower end thereof, each of said connector means having means for substantially sealing the lower end thereof for preventing fluid circulation from one motor module to another.

35. A submersible modular motor assembly comprising at least two identical electric motor modules releasibly connected together at their adjacent ends in vertically stacked end-to-end relation, and connector means connecting the adjacent ends of each pair of said motor modules and an auxiliary module secured to the upper end of the upper motor module and adapted to connect the assembly to a device to be driven, each motor module having a thrust bearing for carrying the thrust of said motor module, and said auxiliary module having a thrust bearing carrying the thrust of said auxiliary module and the device driven by said assembly.

36. A submersible module for use with first and second sealed liquid filled units, comprising an outer casing, means in said casing forming a first equalizing chamber for equalizing the pressure within said first unit with the pressure at the exterior of said units, first fluid passageway means in said casing extending from the exterior of said casing to said first chamber, said first chamber and said first passageway means being adapted to be filled with liquid which is substantially the same as that filling said units, and said first passageway means extending upwardly above said first chamber and including an enlarged portion comprising a gas separation chamber, means in said casing forming a second equalizing chamber for equalizing the pressure within said second unit with the pressure at the exterior of said units, and second fluid passageway means in said casing extending from said second chamber to said enlarged portion of said first passageway means, said second chamber and said second passageway means also being adapted to be filled with liquid similar to that filling said units.

37. A submersible module for use with at least one sealed liquid filled unit, comprising an outer casing, means in said casing forming at least one equalizing chamber for equalizing the pressure within said unit with the pressure exterior of said unit, fluid passageway means in said casing extending from the exterior of said casing to said chamber, said chamber and said passageway being adapted to be filled with liquid which is substantially the same as that filling said unit, and a two-way check valve in said passageway means, said valve opening for fluid flow therethrough in either direction at a predetermined pressure difference.

38. Apparatus as in claim 37, wherein said pressure difference is the same for fluid flow in either direction, and is relatively low as compared with the pressures developed due to thermal expansion and contraction of the fluid within said unit.

39. A submersible module for use with a sealed liquid filled unit including at least one rotary shaft seal, comprising an outer casing, means in said casing forming at least one equalizing chamber for equalizing the pressure within said unit with the pressure exterior of said unit, fluid passageway means in said casing extending from the exterior of said casing to said chamber, said chamber and said passageway being adapted to be filled with liquid which is substantially the same as that filling said unit, and a two-way check valve in said passageway, said valve opening for fluid flow therethrough in either direction at a predetermined pressure difference, said pressure difference being greater than the pressure developed due to failure of the rotary shaft seal in the unit but less than the pressure developed due to thermal expansion and contraction of the fluid in the unit.

40. A submersible module for use with a least one sealed liquid filled unit, comprising an outer casing, means in said casing forming at least one pressure eqaulizing chamber, means in said casing forming a gas separation chamber, first means placing the upper portion of said equalizing chamber in pressure communication with the interior of said unit, second means placing the lower portion of said equalizing chamber in pressure communication with the lower portion of said gas separation chamber, and third means placing the upper portion of said gas separation chamber in communication with the exterior of said casing, whereby said equalizing chamber equalizes the pressure within said unit with the pressure outside of said unit and said gas separation chamber prevents gas from outside of said unit and carried by the well fluid into said gas separation chamber from entering said equalizing chamber and said unit.

References Cited

UNITED STATES PATENTS

| | | | |
|---|---|---|---|
| 1,960,484 | 5/1934 | E. C. Ekstromer | 310—112 |
| 1,970,484 | 8/1934 | A. Arutunoff | 310—87 |
| 2,002,907 | 5/1935 | C. R. Sessions | 310—87 |
| 2,098,958 | 11/1937 | E. C. Ekstromer | 310—112 |
| 2,219,318 | 10/1940 | V. A. Hoover | 310—87 |
| 2,240,569 | 5/1941 | T. G. Myers | 310—87 |
| 3,255,367 | 6/1966 | E. J. Schaefer | 310—90 |

MILTON O. HIRSCHFIELD, *Primary Examiner.*

L. L. SMITH, *Assistant Examiner.*

UNITED STATES PATENT OFFICE
CERTIFICATE OF CORRECTION

Patent No. 3,384,769                 May 21, 1968

Edward J. Schaefer et al.

It is certified that error appears in the above identified patent and that said Letters Patent are hereby corrected as shown below:

Column 6, line 56, "putty" should read -- potting --. Column 8, lines 42 and 43, "casing" should read -- casting --. Column 13, line 6, "173" should read -- 174 --. Column 19, line 31, "306" should read -- 406 --. Column 24, line 13, "exterior" should read -- interior --.

Signed and sealed this 20th day of January 1970.

(SEAL)
Attest:

Edward M. Fletcher, Jr.             WILLIAM E. SCHUYLER, JR.
Attesting Officer                    Commissioner of Patents